(12) United States Patent
Uenaka et al.

(10) Patent No.: US 8,988,316 B2
(45) Date of Patent: Mar. 24, 2015

(54) DISPLAY DEVICE

(71) Applicant: Panasonic Corporation, Osaka (JP)

(72) Inventors: Hiroyuki Uenaka, Hyogo (JP); Mika Sakai, Shizuoka (JP); Shinichi Sato, Miyagi (JP); Naoyuki Tsuboi, Shizuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 86 days.

(21) Appl. No.: 13/903,604

(22) Filed: May 28, 2013

(65) Prior Publication Data

US 2013/0257693 A1 Oct. 3, 2013

Related U.S. Application Data

(63) Continuation of application No. PCT/JP2012/004341, filed on Jul. 4, 2012.

(30) Foreign Application Priority Data

Feb. 21, 2012 (JP) ................................. 2012-034621

(51) Int. Cl.
*G02B 27/01* (2006.01)
*G09G 3/02* (2006.01)
(Continued)

(52) U.S. Cl.
CPC ............ *G02B 27/0172* (2013.01); *G09G 3/025* (2013.01); *G09G 3/346* (2013.01);
(Continued)

(58) Field of Classification Search
CPC ............. G02B 27/017; G02B 27/0172; G02B 27/014; G02B 2027/011; G02B 26/105; G09G 3/025; G09G 2340/0464; G09G 2310/02; G09G 2300/26; G09G 3/346; H04N 9/3129

USPC ............ 345/8, 204; 359/199.1, 223.1, 225.1, 359/290, 291
See application file for complete search history.

(56) References Cited

U.S. PATENT DOCUMENTS 7,079,297 B2   7/2006   Sakai
7,133,061 B2   11/2006  Dewa et al.
(Continued)

FOREIGN PATENT DOCUMENTS

JP   2003-117897 A   4/2003
JP   2005-526289 A   9/2005
(Continued)

OTHER PUBLICATIONS

International Search Report issued in International Patent Application No. PCT/JP2012/004341 mailed on Aug. 7, 2012.

*Primary Examiner* — Vijay Shankar
*Assistant Examiner* — Abhishek Sarma
(74) *Attorney, Agent, or Firm* — McDermott Will & Emery LLP

(57) ABSTRACT

A display device, including a scanning device, displays an image on a display region using a light ray which scans. The display device includes a light source unit, a scanning control unit, and an emission control unit. The scanning device includes an auxiliary scanning unit which changes an inclination angle of a reflective mirror unit including a reflective mirror and a main scanning unit. The display region includes a plurality of elemental regions coupled to one another. The scanning control unit provides control so that the light ray scans over one of the plurality of elemental regions by changing the inclination angle of the reflective mirror while maintaining the inclination angle of the reflective mirror unit, and control so that the plurality of elemental regions are changed over by changing the inclination angle of the reflective mirror unit.

2 Claims, 16 Drawing Sheets

(51) Int. Cl.
*G09G 3/34* (2006.01)
*H04N 5/64* (2006.01)

(52) U.S. Cl.
CPC ........... *H04N 5/64* (2013.01); *G09G 2300/026* (2013.01); *G09G 2310/02* (2013.01); *G09G 2340/0464* (2013.01); *G02B 2027/014* (2013.01)
USPC .......................... 345/8; 359/199.1; 359/223.1

(56) References Cited

U.S. PATENT DOCUMENTS

| | | | |
|---|---|---|---|
| 7,252,394 | B1 | 8/2007 | Fu |
| 7,262,894 | B2 | 8/2007 | Oettinger et al. |
| 7,817,178 | B2 | 10/2010 | Bush et al. |
| 2004/0004585 | A1 | 1/2004 | Brown et al. |
| 2005/0035682 | A1 | 2/2005 | Tsuboi et al. |
| 2006/0244807 | A1 | 11/2006 | Keithley |
| 2007/0058086 | A1 | 3/2007 | Yeo et al. |
| 2008/0211900 | A1 | 9/2008 | Keithley |
| 2010/0201292 | A1 | 8/2010 | Krueger et al. |
| 2011/0012874 | A1* | 1/2011 | Kurozuka .................... 345/204 |
| 2011/0205609 | A1 | 8/2011 | Mizoguchi |

FOREIGN PATENT DOCUMENTS

| | | |
|---|---|---|
| JP | 2006-306102 A | 11/2006 |
| JP | 2007-079577 A | 3/2007 |
| JP | 2009-058753 A | 3/2009 |
| JP | 4379331 B2 | 12/2009 |
| JP | 2010-008614 A | 1/2010 |
| JP | 2011-107347 A | 6/2011 |

* cited by examiner

FIG.8
(a)
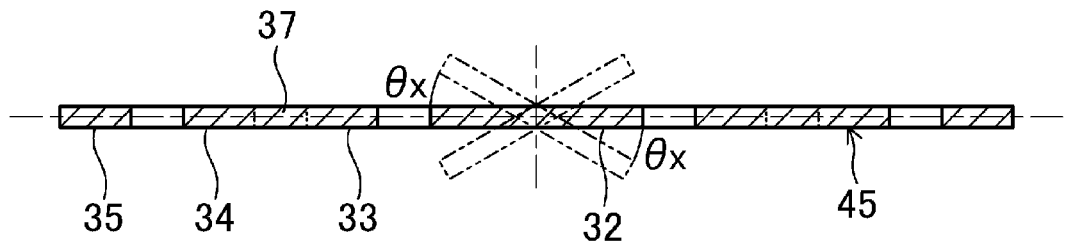
(b)
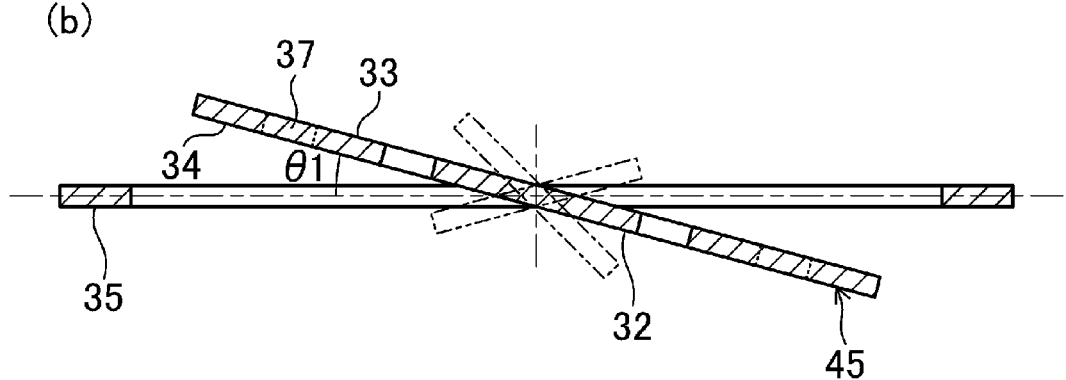
(c)
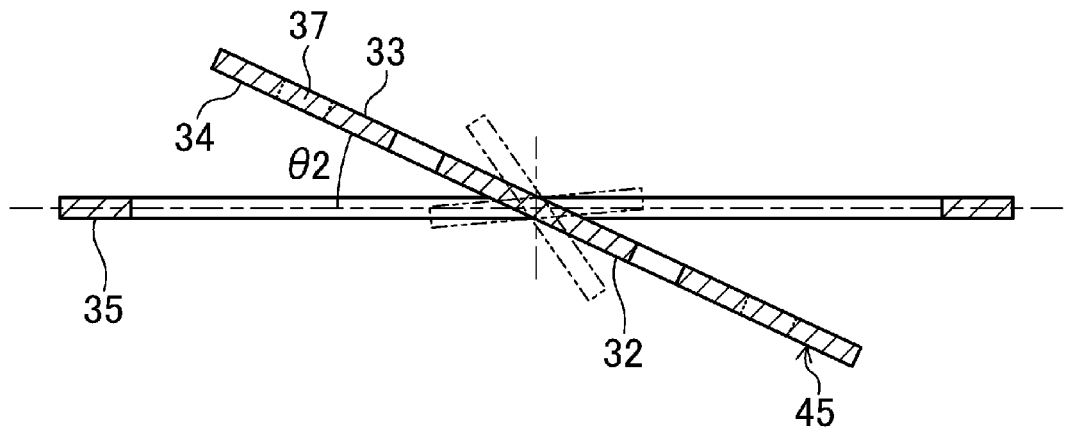

DISPLAY DEVICE

CROSS-REFERENCE TO RELATED APPLICATION

This is a continuation of PCT International Application PCT/JP2012/004341 filed on Jul. 4, 2012, which claims priority to Japanese Patent Application No. 2012-034621 filed on Feb. 21, 2012. The disclosures of these applications including the specifications, the drawings, and the claims are hereby incorporated by reference in their entirety.

BACKGROUND

The present disclosure relates to display devices, such as see-through head-mounted displays (HMDs) etc., which emit light and display images in display regions.

Japanese Patent No. 4379331 (Patent Document 1) discloses a display device which includes a reflective mirror having a very small size.

In this display device, a pair of pivot arms is disposed for each of two (horizontal and vertical) scan directions. The reflective mirror is constantly moved by a small angle each time using these pivot arms, and thus light scans in both the horizontal and vertical directions.

SUMMARY

The present disclosure provides a scanning device capable of easily broadening a scanned area, and a display device capable of providing a large display.

A scanning device in association with the present disclosure is a scanning device which causes a light ray to scan over a display region. The scanning device includes a reflective mirror which reflects the light ray toward the display region, a main scanning unit which changes an inclination angle of the reflective mirror, a reflective mirror unit which includes the reflective mirror and the main scanning unit, and an auxiliary scanning unit which changes an inclination angle of the reflective mirror unit.

A display device according to the present disclosure, for example, displays an image on a display region by means of a light ray which scans, and includes the scanning device described above. The display device includes a light source unit which emits the light ray toward the scanning device, a scanning control unit which controls the scanning device, and an emission control unit which controls the light source unit so as to emit the light ray in synchronism with displaying of the image. The display region includes a plurality of elemental regions coupled to one another. The scanning control unit provides control so that the light ray scans over one of the plurality of elemental regions by changing the inclination angle of the reflective mirror while maintaining the inclination angle of the reflective mirror unit, and also provides control so that the plurality of elemental regions are changed over by changing the inclination angle of the reflective mirror unit.

Another display device according to the present disclosure, for example, displays an image on a display region by means of a light ray which scans, and includes the scanning device described above. The display device includes a light source unit which emits the light ray toward the scanning device, a scanning control unit which controls the scanning device, and an emission control unit which controls the light source unit so as to emit the light ray in synchronism with displaying of the image. The main scanning unit operates so as to cause the light ray to scan over a certain scanned area having a smaller size than the display region. The scanning control unit changes the inclination angle of the reflective mirror, thereby causing the light ray to scan over the scanned area, and also changes the inclination angle of the reflective mirror unit, thereby shifting the scanned area within the display region.

The display devices according to the present disclosure can provide large displays.

BRIEF DESCRIPTION OF THE DRAWINGS

FIG. 8 is a schematic view illustrating cross-sections taken along line I-I of FIG. 3. The parts (a)-(c) respectively illustrate different states.

DETAILED DESCRIPTION

An embodiment is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

(Configuration of Display Device)

Figure 1:
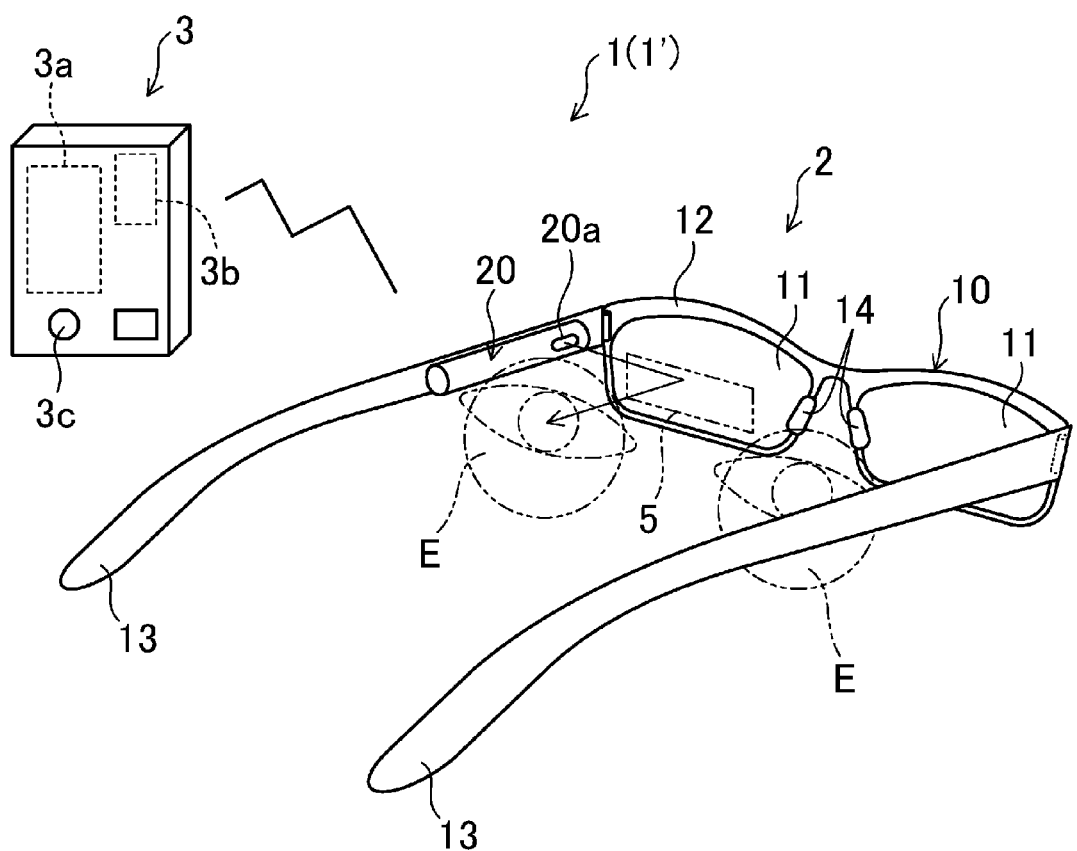
FIG. 1 is a schematic perspective view illustrating a head-mounted display (HMD).

FIG. 1 illustrates a see-through HMD 1 (an example of a display device) of this embodiment. The HMD 1 shown includes an eyewear display 2, a control terminal 3, etc.

The eyewear display 2 includes an eyewear unit 10 and a laser unit 20. The eyewear unit 10 includes a pair of lenses 11, a lens frame 12, a pair of temples 13, a pair of nose pads 14, etc.

In the eyewear unit 10, the pair of lenses 11 and 11 is supported by the lens frame 12, which is horizontally long, and the pair of lenses 11 and 11 is disposed side by side in the horizontal direction. The pair of nose pads 14 and 14 is placed between the lenses 11 and 11. The temples 13 and 13, which extend, facing each other, in a generally perpendicular direction to the lens frame 12, are foldably attached to the respective edges of the lens frame 12.

As with normal eyewear, the eyewear unit 10 is worn with both the nose pads 14 placed on the noses and with both the temples 13 placed on the ears of a user. This allows both the lenses 11 to be positioned just before both eyes (eyeballs E).

The control terminal 3 displays an image in cooperation with the laser unit 20. The control terminal 3 includes a memory device 3a which stores image data, a communication device 3b which wirelessly transmits the image data to the laser unit 20, a control device 3c which controls, for example, turning on and off of the laser unit 20.

Note that the control terminal 3 is not essential for the HMD 1. For example, by incorporating the functions provided by the control terminal 3 into the laser unit 20, the control terminal 3 can be omitted.

The laser unit 20 has an appearance of a small rod or pole, and is attached to the eyewear unit 10. The laser unit 20 is installed along and inside one of the temples 13. An emission opening 20a is formed in the laser unit 20. Through the emission opening 20a, a laser beam is emitted toward one of the lenses 11.

The laser beam is emitted to a display region 5 which is provided on the one of the lenses 11. Although not shown, a deflecting structure which deflects the emitted laser beam is formed in the display region 5. This deflecting structure allows the laser beam emitted to the display region 5 to be reflected toward the pupil of the eyeball E. The reflected light is then focused on the retina of the eyeball E, and thus an image generated by the laser beam can be visually recognized by the user.

The deflecting structure may be implemented in various manners, including, for example, a half mirror structure, a frosted glass structure, a laminated structure of films including luminescent material, etc. A holographic element and a diffractive optical element may also be used as the deflecting structure. In fact, whatever can reflect the emitted laser beam toward one eye may be used.

Figure 2:
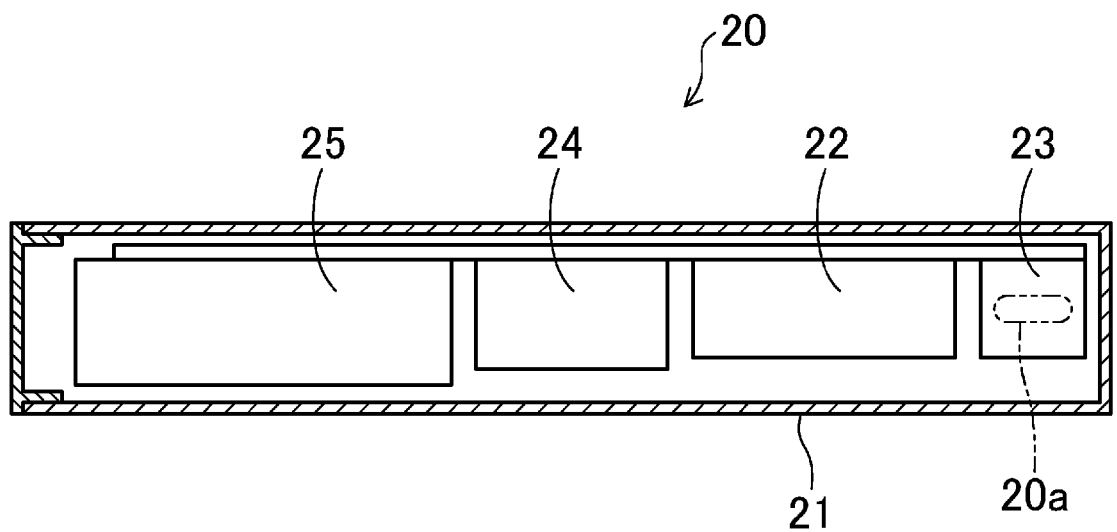
FIG. 2 is a schematic cross-sectional view illustrating a configuration of the laser unit.

FIG. 2 illustrates a configuration of the laser unit 20. The laser unit 20 includes a unit housing 21, a laser light source 22 (light source unit), a scanning device 23, a controller unit 24, a battery 25, etc. The laser light source 22, the scanning device 23, the controller unit 24, and the battery 25 are contained in the unit housing 21.

The laser light source 22 generates a laser beam, and emits the laser beam toward the scanning device 23. Considering the cost and size thereof, a semiconductor laser is used as the laser light source 22 of this embodiment.

The battery 25 supplies power to the laser light source 22, to the scanning device 23, and to the controller unit 24. It is preferable that the battery 25 be replaceable or rechargeable. For example, one possible configuration is such that a charging terminal is provided on the outer surface of the unit housing 21, and the battery 25 can be recharged through the charging terminal.

(Configuration of Scanning Device)

The scanning device 23 reflects the laser beam toward the display region 5, and thus causes the laser beam to scan over the display region 5. In this embodiment, a MEMS mirror 30 is used in a main portion of the scanning device 23.

MEMS stands for "micro electronics mechanical system." A MEMS is a device in which mechanical components, sensors, actuators, electronic circuits, etc. are integrated on a single silicon substrate, glass substrate, organic material, etc. The MEMS mirror 30 is a device in which such a MEMS technology is applied to optical processes, and is suitable for size reduction.

Figure 3:
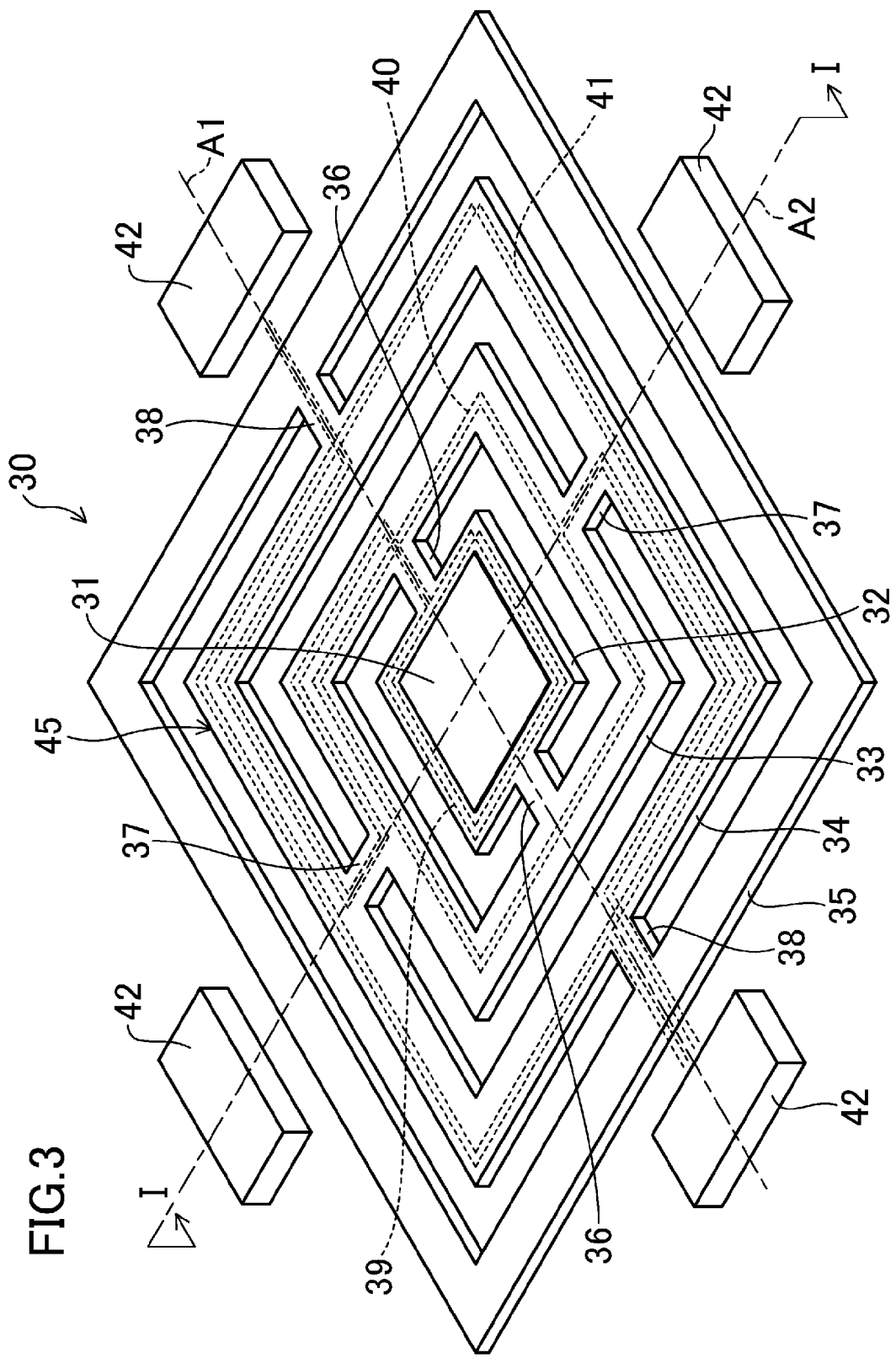
FIG. 3 is a schematic perspective view illustrating a configuration of the main portion of the scanning device.

FIG. 3 illustrates a configuration of the MEMS mirror 30. The MEMS mirror 30 of this embodiment includes a reflective mirror 31, a support plate 32, an inner frame 33 (first support member), an outer frame 34 (second support member), a support frame 35 (third support member), first support arms 36, second support arms 37, third support arms 38, a first coil 39, a second coil 40, a third coil 41, and permanent magnets 42.

The components disposed inside and including the outer frame 34 of the components described above, that is, the reflective mirror 31, the support plate 32, the inner frame 33, the outer frame 34, the first support arms 36, and the second support arms 37 form a reflective mirror unit 45. The first support arms 36 and the second support arms 37 form a main scanning unit, and the third support arms 38 form an auxiliary scanning unit.

The support plate 32, the inner frame 33, the outer frame 34, the support frame 35, the first support arms 36, the second support arms 37, and the third support arms 38 are formed using, for example, thin films such as silicon wafers having a thickness less than 1 mm. These components are monolithically formed using a known technology for thin film formation such as semiconductor manufacturing processes.

The support frame 35 is formed in a hollow rectangular shape. The outer frame 34 is formed in a hollow rectangular shape which is slightly smaller than the support frame 35. The outer frame 34 is disposed in the opening of the support frame 35 in a spaced-apart arrangement. The inner frame 33 is formed in a hollow rectangular shape which is slightly smaller than the outer frame 34. The inner frame 33 is disposed in the opening of the outer frame 34 in a spaced-apart arrangement. The support plate 32 is formed in a planar rectangular shape which is slightly smaller than the inner frame 33. The support plate 32 is disposed in the opening of the inner frame 33 in a spaced-apart arrangement. The reflective mirror 31 is placed on the upper surface of the support plate 32.

The first support arms 36 are disposed in the gap between the support plate 32 and the inner frame 33, and couple together the support plate 32 and the inner frame 33. The second support arms 37 are disposed in the gap between the inner frame 33 and the outer frame 34, and couple together the inner frame 33 and the outer frame 34. The third support arms 38 are disposed in the gap between the outer frame 34 and the support frame 35, and couple together the outer frame 34 and the support frame 35.

The first support arms 36, the second support arms 37, and the third support arms 38 are provided in pairs. The first support arms 36 etc. are disposed on respective sides which face each other, of the support frame 35 etc. The first support arms 36 are arranged so as to extend along a first axis A1 which passes through the center of the support plate 32. The second support arms 37 are arranged so as to extend along a second axis A2 which passes through the center of the support plate 32, and is perpendicular to the first axis A1.

The third support arms 38 of this embodiment are aligned with the first support arms 36. That is, the third support arms 38 are arranged so as to extend along the first axis A1.

The first support arms 36, the second support arms 37, and the third support arms 38 are all torsionally deformable. Thus, the support plate 32 is rotatable about the first axis A1 with respect to the inner frame 33; the inner frame 33 is rotatable about the second axis A2 with respect to the outer frame 34; and the outer frame 34 is rotatable about the first axis A1 with respect to the support frame 35. The support frame 35 is fixed to the scanning device 23.

The first coil 39 is provided in the support plate 32. The first coil 39 is arranged so as to circulate in the support plate 32. The second coil 40 is provided in the inner frame 33. The second coil 40 is arranged so as to circulate in the inner frame 33. The third coil 41 is provided in the outer frame 34. The third coil 41 is arranged so as to circulate in the outer frame 34. There are four of the permanent magnets 42, and each of the permanent magnets 42 is provided in the vicinity on the external side of each of the four sides of the support frame 35.

Thus, in this scanning device 23, supplying current to the first coil 39 results in a Lorentz force, thereby causing the first support arms 36 to torsionally twist. This twist causes the support plate 32 to rotate about the first axis A1 depending on the amount of the current. In addition, supplying current to the second coil 40 causes the second support arms 37 to torsionally twist, thereby causing the inner frame 33 to rotate about the second axis A2 depending on the amount of the current. Furthermore, supplying current to the third coil 41 causes the third support arms 38 to torsionally twist, thereby causing the outer frame 34 to rotate about the first axis A1 depending on the amount of the current.

That is, in the case of this scanning device 23, controlling the amount of the current which is supplied to the first coil 39 and to the second coil 40 allows the inclination angle of the reflective mirror 31 to be changed about the first axis A1 and about the second axis A2. Also, controlling the amount of the current which is supplied to the third coil 41 allows the inclination angle of the reflective mirror unit 45 to be changed about the first axis A1.

Figure 4:
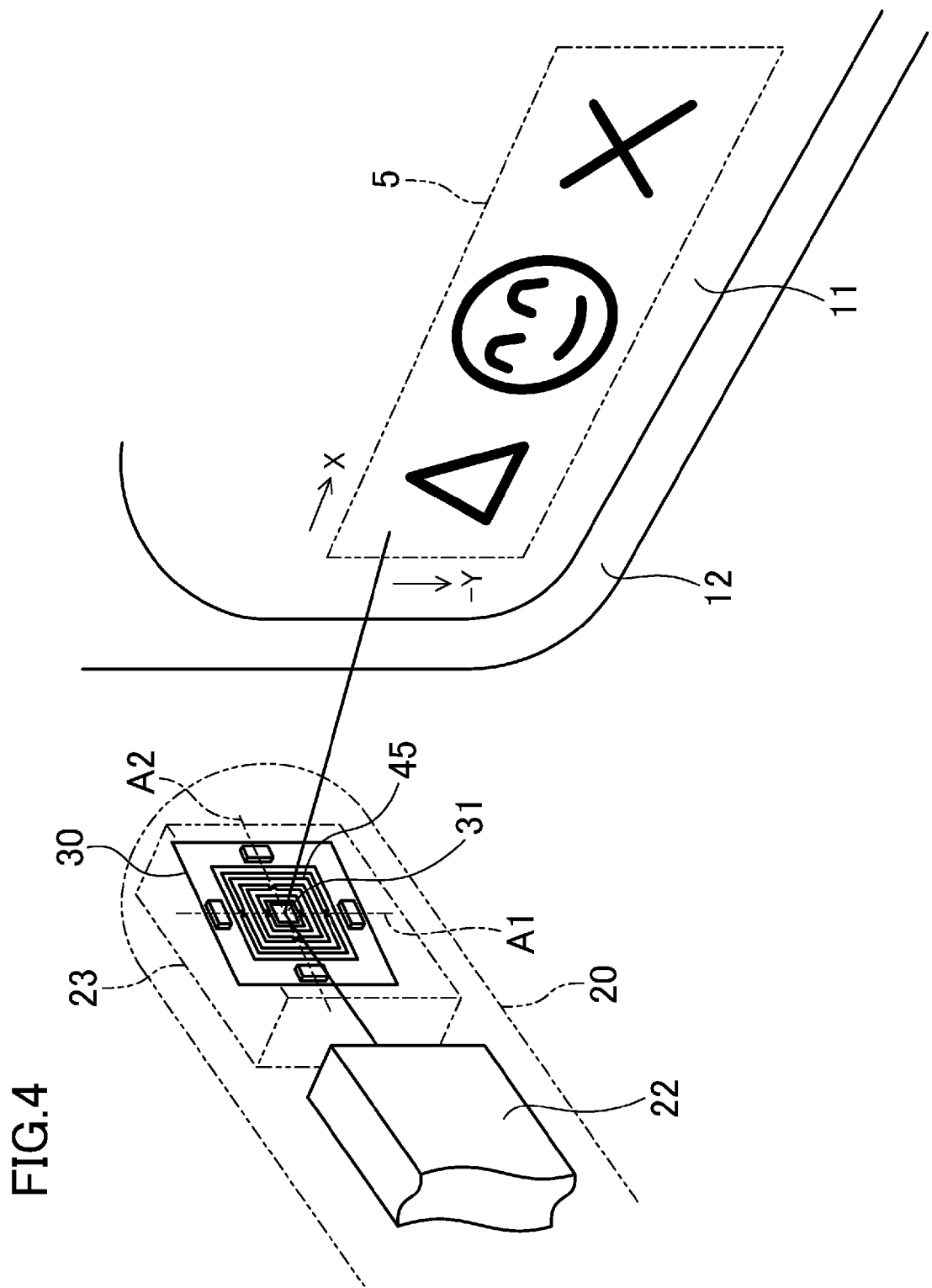
FIG. 4 is a schematic perspective view illustrating an arrangement of the main portion of the scanning device.

As shown in FIG. 4 for example, the scanning device 23 is arranged so that the laser beam strikes the reflective mirror 31, and is then reflected to the display region 5. Controlling the inclination angle of the reflective mirror 31 causes the reflected laser beam to scan over the display region 5.

More specifically, the reflected laser beam scans along an X axis which extends in a transverse direction of the display region 5 by controlling the inclination angle of the reflective mirror 31 about the first axis A1. In addition, the reflected laser beam scans along a Y axis which extends in a longitudinal direction of the display region 5 (perpendicular to the X axis) by controlling the inclination angle of the reflective mirror 31 about the second axis A2.

Furthermore, by controlling the inclination angle of the reflective mirror unit 45 about the first axis A1, this scanning device 23 broadens in the X axis direction the range in which scanning can be performed in the display region 5 without changing the inclination angle of the reflective mirror 31 (inclination angle with respect to the inner frame 33). (A more detailed description is provided later.)

Figure 5:
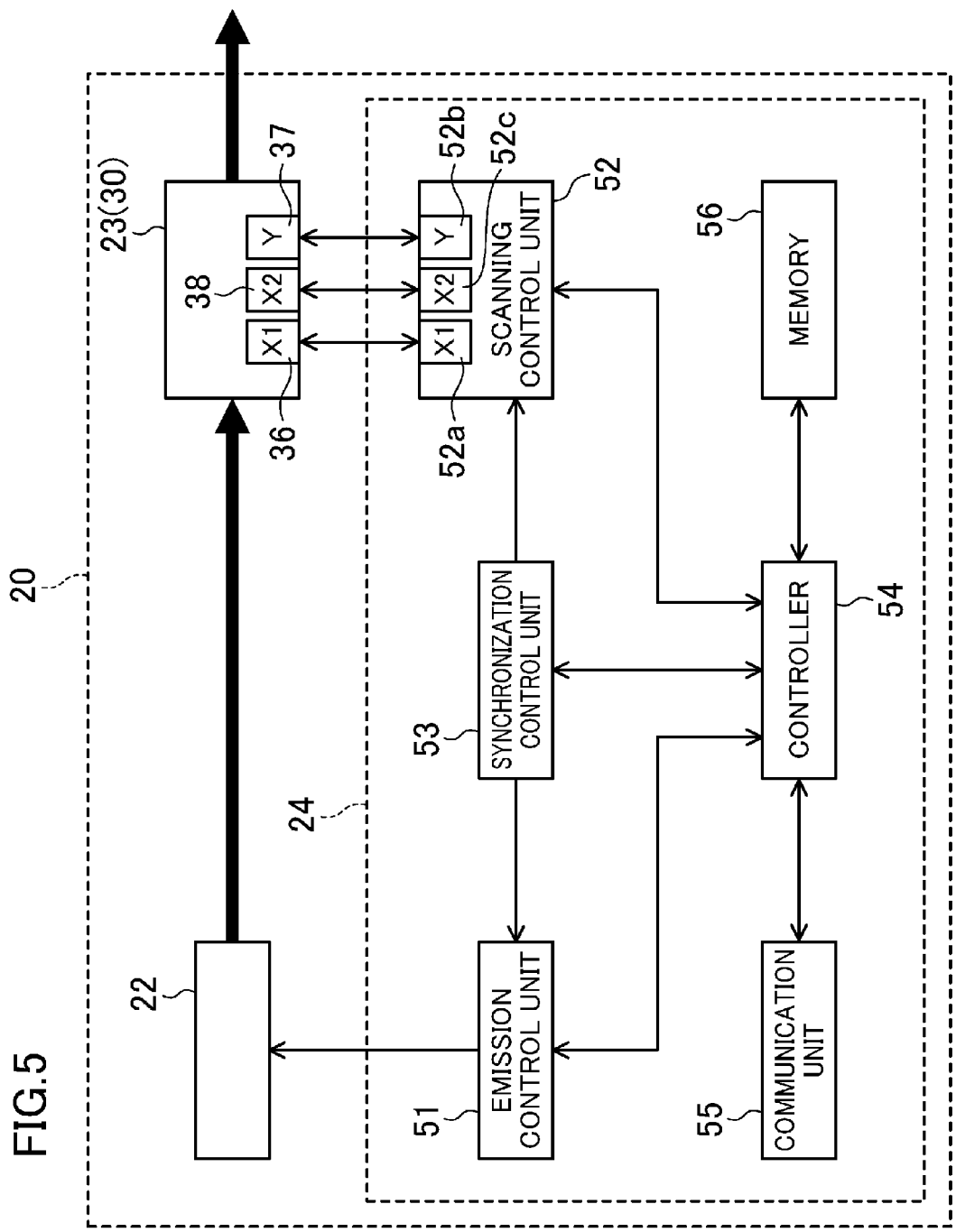
FIG. 5 is a block diagram illustrating a configuration of the laser unit.

FIG. 5 illustrates a configuration of the laser unit 20 including the controller unit 24. Driving of the laser light source 22 and of the scanning device 23 is controlled by the controller unit 24. The controller unit 24 includes an emission control unit 51, a scanning control unit 52, a synchronization control unit 53, a controller 54, a communication unit 55, and a memory 56.

The emission control unit 51 controls starting and stopping of emitting the laser beam, and/or the output intensity of the laser beam, in cooperation with the laser light source 22. In particular, as described in more detail later, the emission control unit 51 provides control so that the laser beam is emitted in synchronism with displaying of an image.

The scanning control unit 52 controls the scanning by the laser beam in cooperation with the scanning device 23. More specifically, the scanning control unit 52 includes a first control unit 52a, a second control unit 52b, and a third control unit 52c.

The first control unit 52a controls the twist of the first support arms 36 to adjust the inclination angle of the reflective mirror 31 about the first axis A1, thereby allowing the scanning in the X axis direction of the display region 5. The second control unit 52b controls the twist of the second support arms 37 to adjust the inclination angle of the reflective mirror 31 about the second axis A2, thereby allowing the scanning in the Y axis direction of the display region 5.

The third control unit 52c controls the twist of the third support arms 38 to adjust the inclination angle of the reflective mirror unit 45 about the first axis A1, thereby broadening in the X axis direction the range in which scanning can be performed.

The synchronization control unit 53, in cooperation with the controller 54, controls synchronization of processes of the emission control unit 51 and of the scanning control unit 52. More specifically, the synchronization control unit 53 outputs synchronization signals to the emission control unit 51 and to the scanning control unit 52 based on an instruction from the controller 54. Inputting the synchronization signals into the emission control unit 51 and into the scanning control unit 52 causes emission and scanning processes to be synchronized.

Synchronized processes of emission and scanning produce a scan line on the display region 5, and thus an image is displayed thereon. Since the HMD 1 displays an image by laser beam emission, a scan line includes a displayed portion which constitutes the image (a portion struck by the laser beam) and a non-displayed portion which does not constitute the image (a portion not struck by the laser beam).

The communication unit 55 communicates with the control terminal 3, and thereby obtains image data from the control terminal 3. Communication between the communication unit 55 and the control terminal 3 may either be wireless or wired, but the wireless type is preferred in terms of usability.

Note that the communication unit 55 is not mandatory. For example, image data may be obtained via a storage medium such as a memory card. If image data can be generated in the controller 54, then neither the communication unit 55 nor the control terminal 3 is necessary. In fact, it is only required that the laser unit 20 can obtain necessary image data.

The memory 56 stores data such as a program, and temporarily stores image data. Examples of the memory 56 include, for example, a dynamic random access memory (DRAM), a static random access memory (SRAM), and a flash memory. The storage capacity of the memory 56 for the image data may be expressed in units of frames, or in units of scan lines. In either case, a high storage capacity is preferred since the operational burden on the controller 54 will be reduced accordingly.

The controller 54 has a calculation function and a control function, and provides general control of the entire laser unit 20. More specifically, the controller 54 performs processes for executing an extraction operation, image processing, etc. on the image data obtained, and for temporarily storing the processed image data in the memory 56, and performs processes for controlling the emission control unit 51, the scanning control unit 52, and the synchronization control unit 53 based on the temporarily stored image data.

(Operations of Scanning Device and Display Device)

Next, operations of the scanning device 23 and of the HMD 1 are described.

Figure 6:
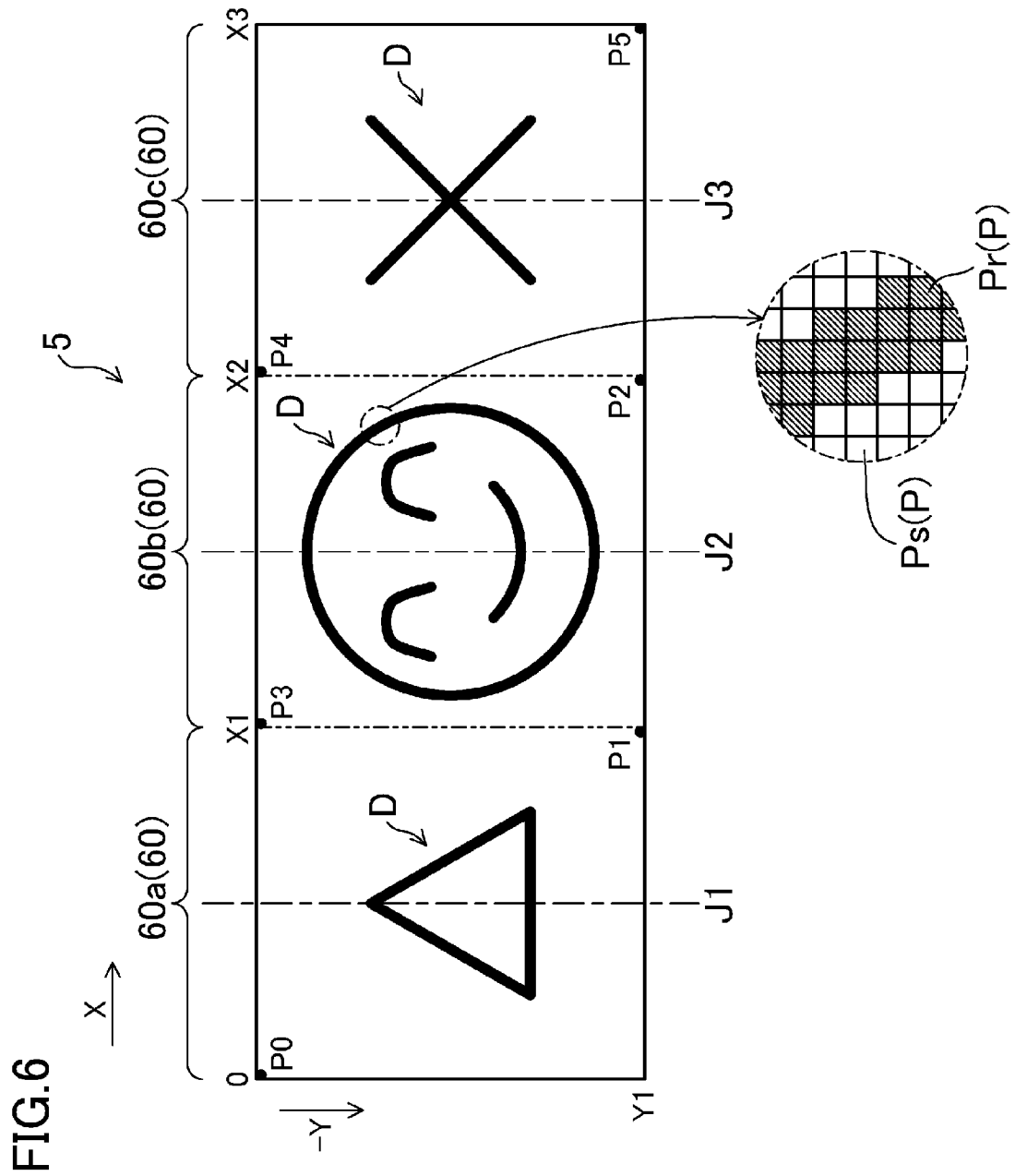
FIG. 6 is a schematic view illustrating the display region.

FIG. 6 illustrates the display region 5. The display region 5 of this embodiment is formed in a horizontally-oriented rectangular shape extending in the X axis direction. More specifically, the display region 5 includes a plurality of elemental regions 60 horizontally coupled in series. The display region 5 of this embodiment includes three elemental regions 60. (These elemental regions 60 are distinguished by reference numerals 60a-60c as appropriate.)

The display region 5, including the elemental regions 60, includes a plurality of pixel regions P arranged in a matrix format along the X and Y axes.

The elemental regions 60 have rectangular shapes of a same dimension, and each have a standard size of a conventional display region. Thus, the display region 5 is broadened in the X axis direction by the number of the elemental regions 60. The length of the display region 5 of this embodiment along the X axis direction is three times as long as a standard display region.

The display region 5 of this embodiment displays a still image D, which represents an icon, in each of the elemental regions 60. Any of the images D may be displayed across adjacent elemental regions 60. Any of the images D may also be a moving image.

In the HMD 1 of this embodiment, scanning is performed on each of the elemental regions 60. For example, in the elemental region 60a located in the leftmost position in FIG. 6, scanning is performed between a pixel region P0 located in the upper left corner thereof and a pixel region P1 located in the lower right corner thereof. More specifically, the scan point moves in the Y axis direction while repeating a scanning operation bidirectionally in the X axis direction between both ends in the elemental region 60a, and thus the entire area of the elemental region 60a is scanned.

During such a scanning operation, emission of a laser beam to the pixel regions P constituting the images D causes the images D to be displayed. For example, as shown in the enlarged view in FIG. 6, the laser beam is emitted to a pixel region Pr which is included in one of the images D, but is not emitted to a pixel region Ps which is not included in the image D. Performing such a series of scanning operations in a short time period causes the scan lines to be viewed as the images D.

Since the display region 5 of this embodiment extends in the X axis direction, scanning over the entire area of the display region 5 only by changing the inclination angle of the reflective mirror requires that the first support arms 36 be torsionally twisted by a large amount. However, the first support arms 36 can be torsionally twisted only in a limited range, and even if a required amount of twist can be achieved, the mechanical load on the first support arms 36 will be high, which may damage the first support arms 36.

Figure 7:
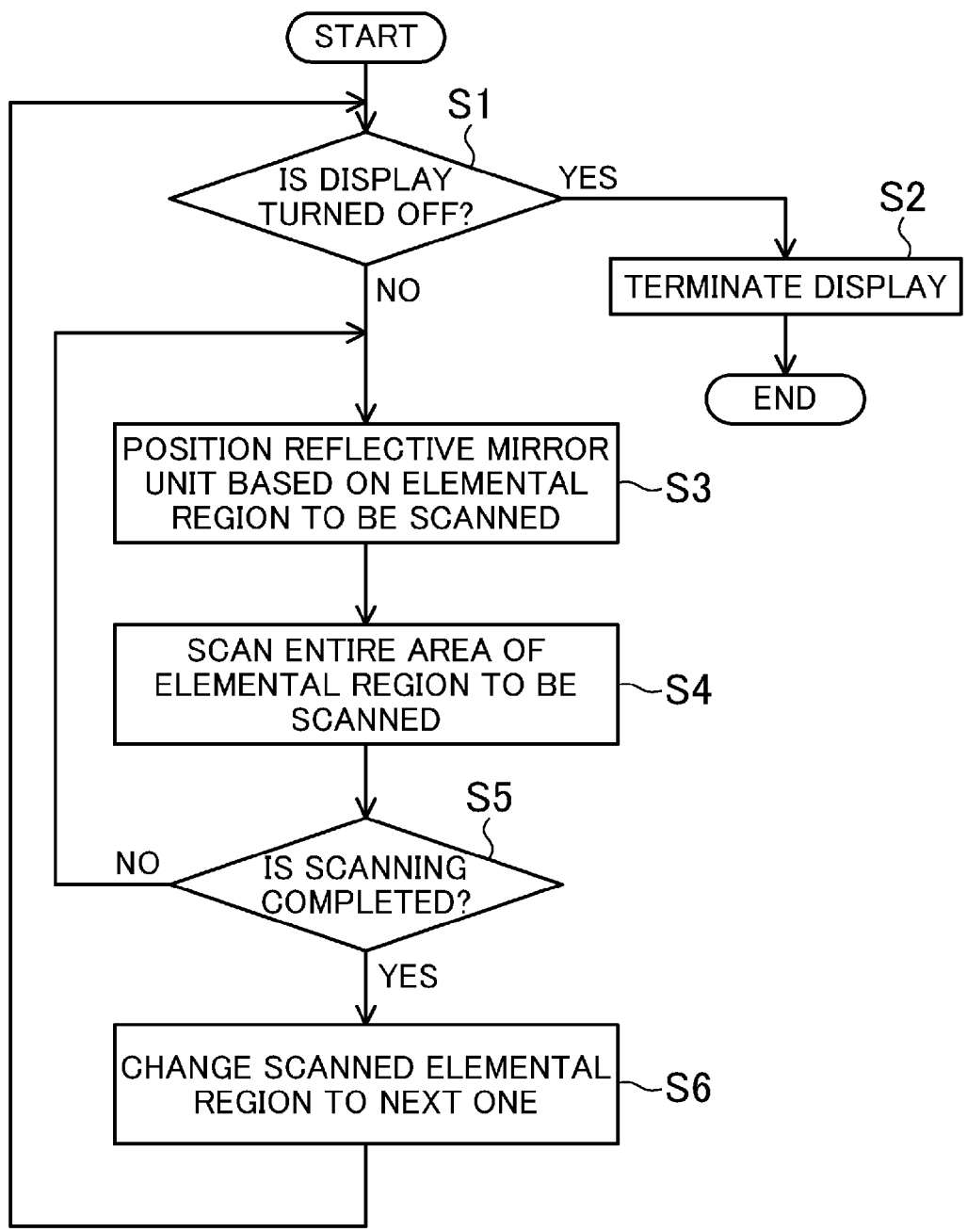
FIG. 7 is a flowchart associated with a display operation of the HMD.

Thus, in order that the entire area of the display region 5 can be scanned without torsionally twisting the first support arms 36 by a large amount, the scanning device 23 of the HMD 1 includes the reflective mirror unit 45 and the third support arms 38. This configuration is described in detail below referring to the flowchart shown in FIG. 7.

For example, the user uses the control terminal 3 to power on the laser unit 20. This operation causes image data to be transmitted to the laser unit 20 through the communication unit 55 as needed, thereby causing the images D to be displayed in the display region 5 until a power-off control is performed by the user (Steps S1 and S2). Although the images D displayed are often still images as shown in the drawings, the images D may be both still and moving images.

Image data obtained through the communication unit 55 is temporarily stored in the memory 56 as appropriate. Based on the temporarily stored image data, the controller 54 controls the third control unit 52c, and thereby positions the reflective mirror unit 45 based on the elemental region 60 to be scanned, that is, the elemental region 60 on which scanning will be started (Step S3).

For example, as shown in part (a) of FIG. 8, when the first support arms 36 and the second support arms 37 are not torsionally twisted, and thus the support plate 32 and the inner frame 33 are in a parallel state (a base state), the inclination angle of the reflective mirror unit 45 is set so that the laser beam is reflected to a center line J1 which halves, in the X axis direction, the elemental region 60a to be scanned as shown in FIG. 6, and then the reflective mirror unit 45 is fixed with that inclination angle.

Then, based on the temporarily stored image data, the controller 54 controls the first control unit 52a and the second control unit 52b. This causes the inclination angle of the reflective mirror 31 to be changed about the first axis A1 and about the second axis A2, thereby causing the laser beam to scan over the entire area of the elemental region 60 (Step S4).

Figure 9:
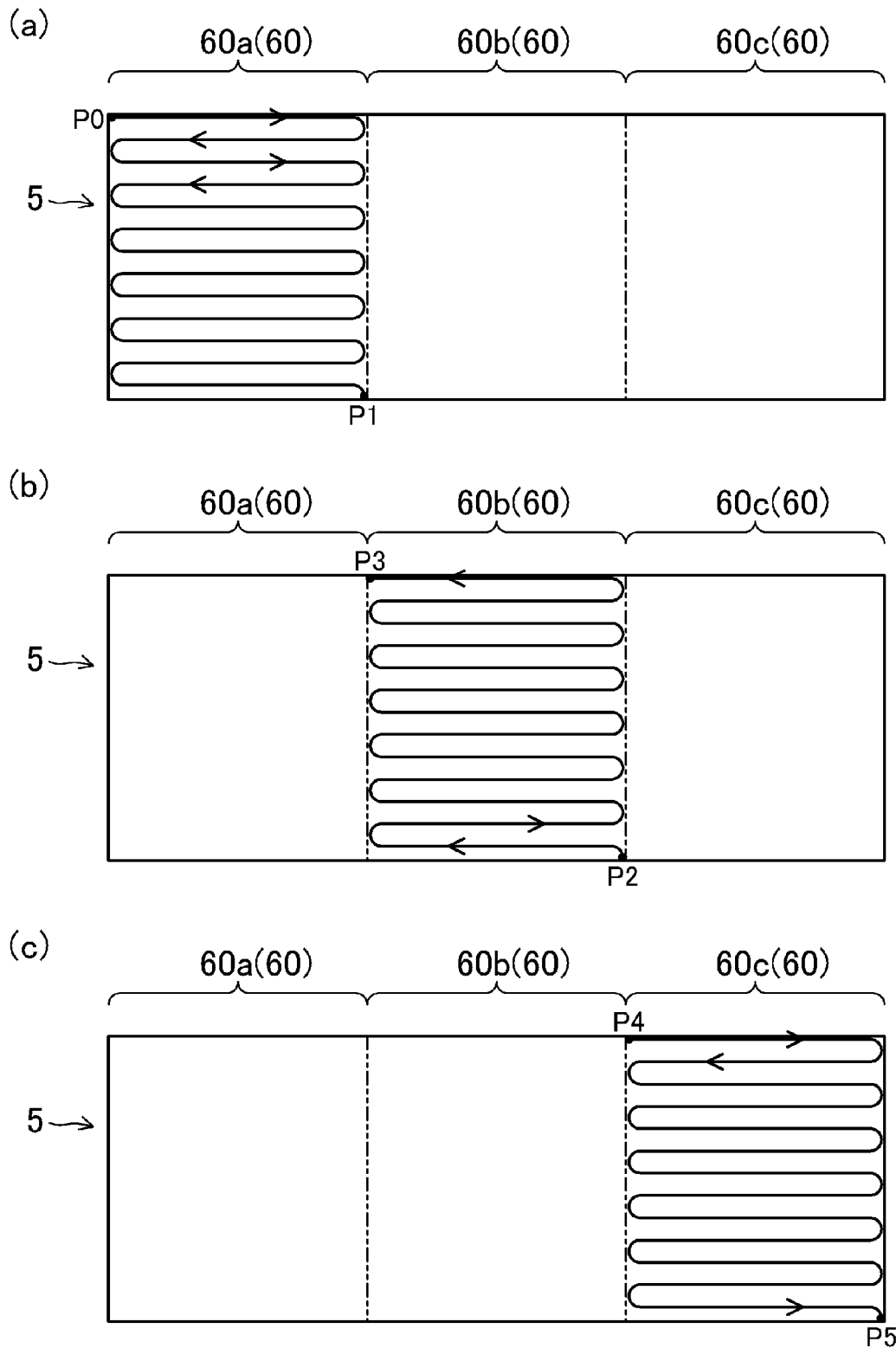
FIG. 9 is a diagram suitable for explaining how a scanning operation proceeds.

For example, as shown in part (a) of FIG. 9, if scanning is started from the pixel region P0, then scanning is performed from the pixel region P0 to the pixel region P1. During this scanning operation, as shown by the phantom lines in part (a) of FIG. 8, the support plate 32 oscillates within a predetermined angle $\theta x$ about the first axis A1 in order that the elemental region 60a is scanned in the X axis direction. Note that, although not shown, the support plate 32 also oscillates within a predetermined angle with respect to the base state about the second axis A2 in order that the elemental region 60a is scanned in the Y axis direction.

When the pixel region P1 is reached and scanning of the elemental region 60a is completed (YES at Step S5), the elemental region 60 scanned is changed to a next one (Step S6).

That is, the controller 54 controls the third control unit 52c, and thereby changes the inclination angle of the reflective mirror unit 45. For example, as shown in part (b) of FIG. 8, the inclination angle of the reflective mirror unit 45 is set to a predetermined angle $\theta 1$ so that the laser beam is reflected to a center line J2 of the elemental region 60b, which will be scanned next, in the base state, and the reflective mirror unit 45 is fixed with that inclination angle (Step S3).

Thus, the range in which scanning can be controlled through the inclination angle of the reflective mirror 31 is shifted in the X axis direction, and moves to the elemental region 60b, which will be scanned next. When the elemental regions 60 change over, the reflective mirror 31 retains the inclination angle (inclination angle with respect to the reflective mirror unit 45) at the completion of scanning of the elemental region 60a, and the reflective mirror unit 45 itself is tilted in such a state, thereby causing the scan point of the pixel region P1 to be moved to the pixel region P2 of the elemental region 60b. Thus, there is an advantage in that the mechanical load on the first support arms 36 and the burden of operational processing for controlling the first support arms 36 are reduced because the twisted state of the first support arms 36 remains the same during this operation.

Then, as shown in part (b) of FIG. 9, scanning is performed from the pixel region P2 to the pixel region P3 in the elemental region 60b in the opposite direction, and thus the entire area thereof is scanned (Step S4). During this scanning operation, as shown by the phantom lines in part (b) of FIG. 8, the support plate 32 oscillates within the predetermined angle θx about the first axis A1 similarly to the case of the elemental region 60a in order that the elemental region 60b is scanned in the X axis direction.

When the pixel region P3 is reached and scanning is completed (YES at Step S5), changeover control of the elemental regions 60 is performed (Step S6).

That is, as with the previous changeover, the controller 54 changes the inclination angle of the reflective mirror unit 45, and as shown in part (c) of FIG. 8, the inclination angle of the reflective mirror unit 45 is set to a predetermined angle θ2, and the reflective mirror unit 45 is fixed with that inclination angle (Step S3).

Thus, the range in which scanning can be controlled through the inclination angle of the reflective mirror 31 is further shifted in the X axis direction by a large amount, and moves to the elemental region 60c, which will be scanned next. With the changeover of the elemental regions 60, the scan point of the pixel region P3 is moved to the pixel region P4 of the elemental region 60c.

Then, as shown in part (c) of FIG. 9, scanning is performed from the pixel region P4 to the pixel region P5 in the elemental region 60c again in the opposite direction, and thus the entire area thereof is scanned (Step S4). During this scanning operation, as shown by the phantom lines in part (c) of FIG. 8, the support plate 32 oscillates similarly to the cases of the other unit regions 60.

When the pixel region P5 is reached and scanning is completed (YES at Step S5), changeover control of the elemental regions 60 is performed (Step S6).

In this HMD 1, the next scanning operation starts in the adjacent elemental region 60, thereby reducing the burden on the third support arms 38. That is, the reflective mirror unit 45 is set to the state shown in part (b) of FIG. 8, and then the elemental region 60b is scanned. Subsequently, the reflective mirror unit 45 is set to the state shown in part (a) of FIG. 8, and then the elemental region 60a is scanned.

Figure 10:
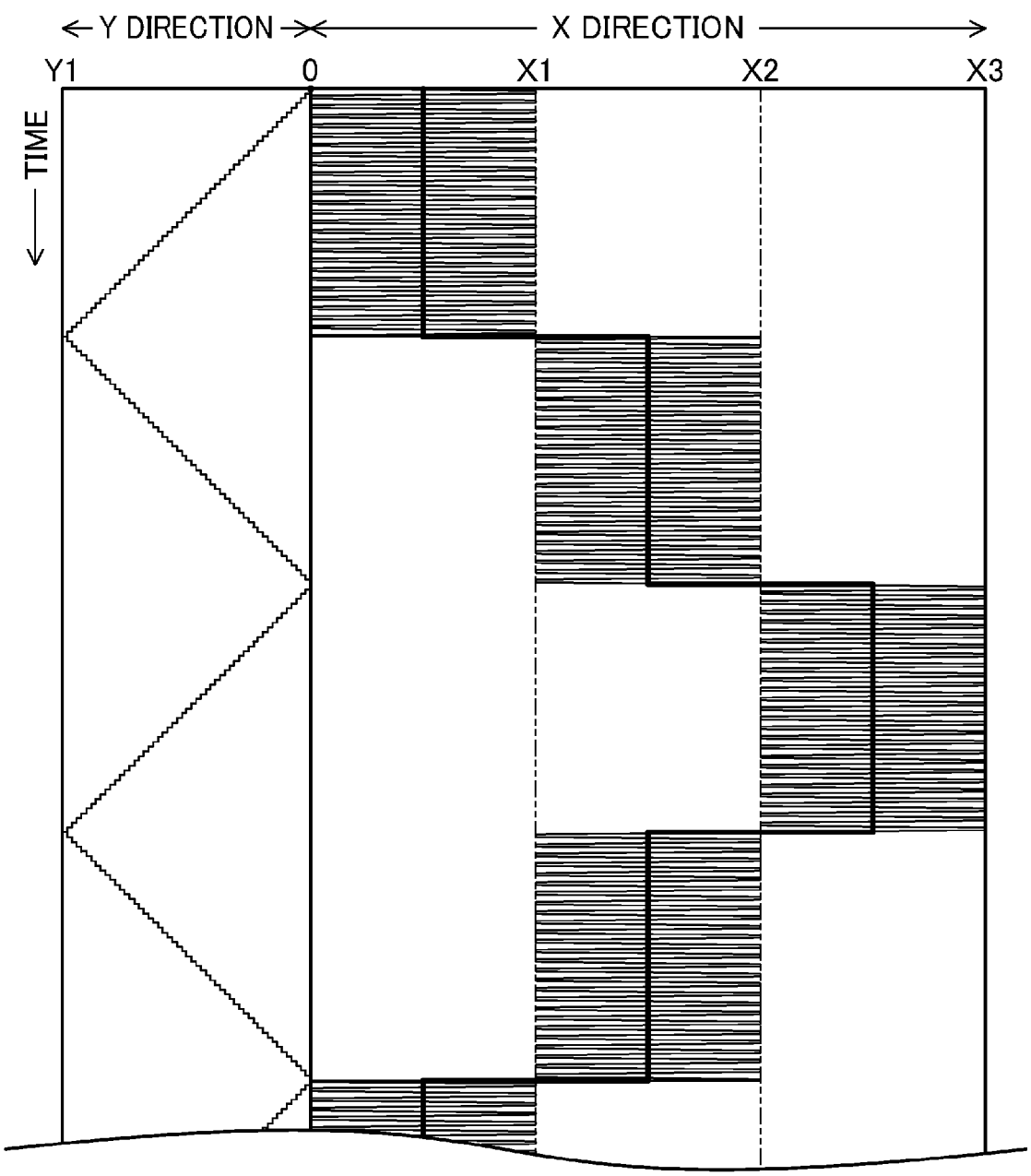
FIG. 10 is a timing chart of a scanning operation in the HMD.

Repeating such a sequence of control causes the images D to be displayed in the display region 5. FIG. 10 illustrates a timing chart of the scanning of this embodiment.

The right side of the timing chart shows the scan point along the X axis direction. The left side of the timing chart shows the scan point along the Y axis direction. The bold lines of the right side of the timing chart represent the locations of the center lines J1 etc.

If the scanning is controlled only by the inclination angle of the reflective mirror 31, then the first support arms 36 would need to be torsionally twisted by a larger angle (θx+θ2). In contrast, in this HMD 1, the third support arms 38 provide a part of that angle (θ2), which eliminates the need for the twisting angle of the first support arms 36 to be changed.

Accordingly, the range in which scanning can be performed can be broadened without increasing the mechanical load on the first support arms 36. In addition, the scanning control operations of the respective elemental regions 60 are performed in a uniform manner, thereby reducing the burden of the control processing.

(Variation)

Figure 11:
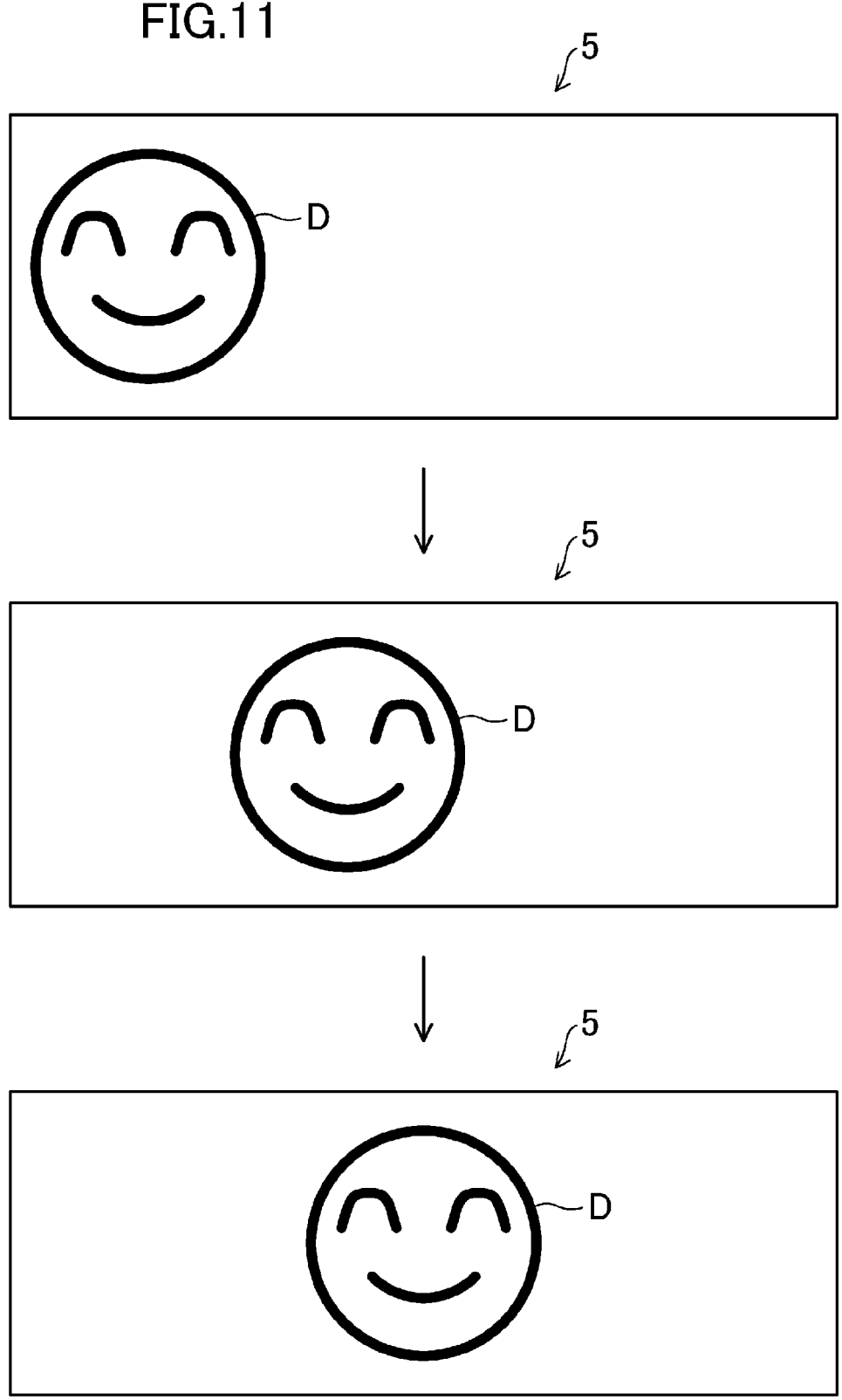
FIG. 11 is schematic view illustrating a display on an HMD of a variation.

A display device of this variation can display the still image D such that it looks like a moving image, for example, as shown in FIG. 11 by changing the control applied to the HMD 1 described above.

The basic configuration and control of the display device of this variation, including the scanning device 23 etc., are similar to those of the HMD 1. Therefore, of the display device of this variation (referred to as HMD 1'), only the differences from those of the HMD 1 will be described in detail below.

In the HMD 1, the entire area of the display region 5 is scanned by changing the inclination angle of the reflective mirror unit 45 for each of the elemental regions 60, thereby periodically changing over the elemental regions 60 scanned. On the other hand, the HMD 1' is configured so that the entire area of the display region 5 is scanned by continuously changing the scanned area.

Figure 12:
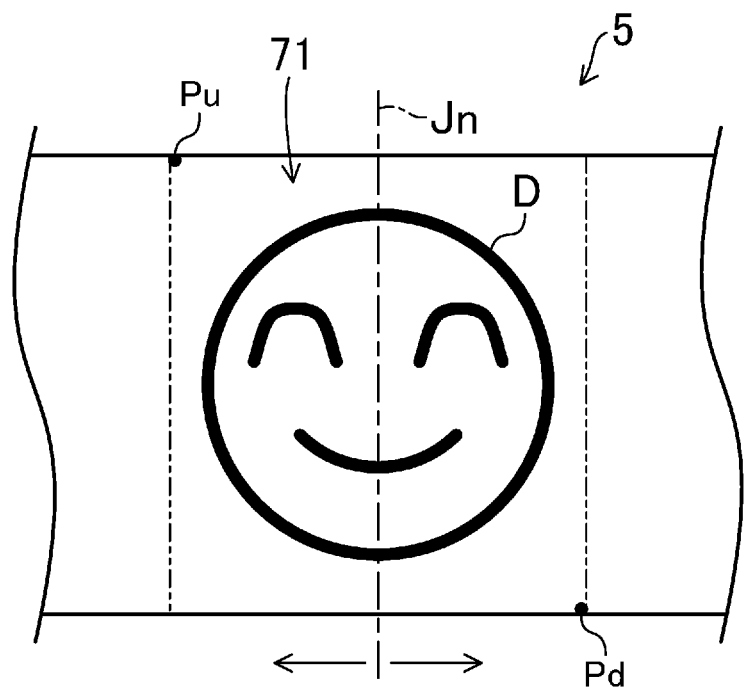
FIG. 12 is a diagram suitable for explaining a scanned area of the HMD of the variation.

For example, as shown in FIG. 12, a predetermined scanned area 71, which corresponds to a elemental region 60 of the HMD 1, is preset in the display region 5 in the HMD 1'. More specifically, the size of the scanned area 71 in the Y axis direction is the same as the size of the display region 5 in the Y axis direction, and the size of the scanned area 71 in the X axis direction is set to a smaller size than the size of the display region 5 in the X axis direction. Information on the scanned area 71 is stored in the memory 56.

In the HMD 1', scanning is performed to display the image D in the scanned area 71, based on the data of the scanned area 71 stored in the memory 56 and on the temporarily stored image data. In the scanned area 71 of this embodiment, a single still image D of an icon is displayed.

Figure 13:
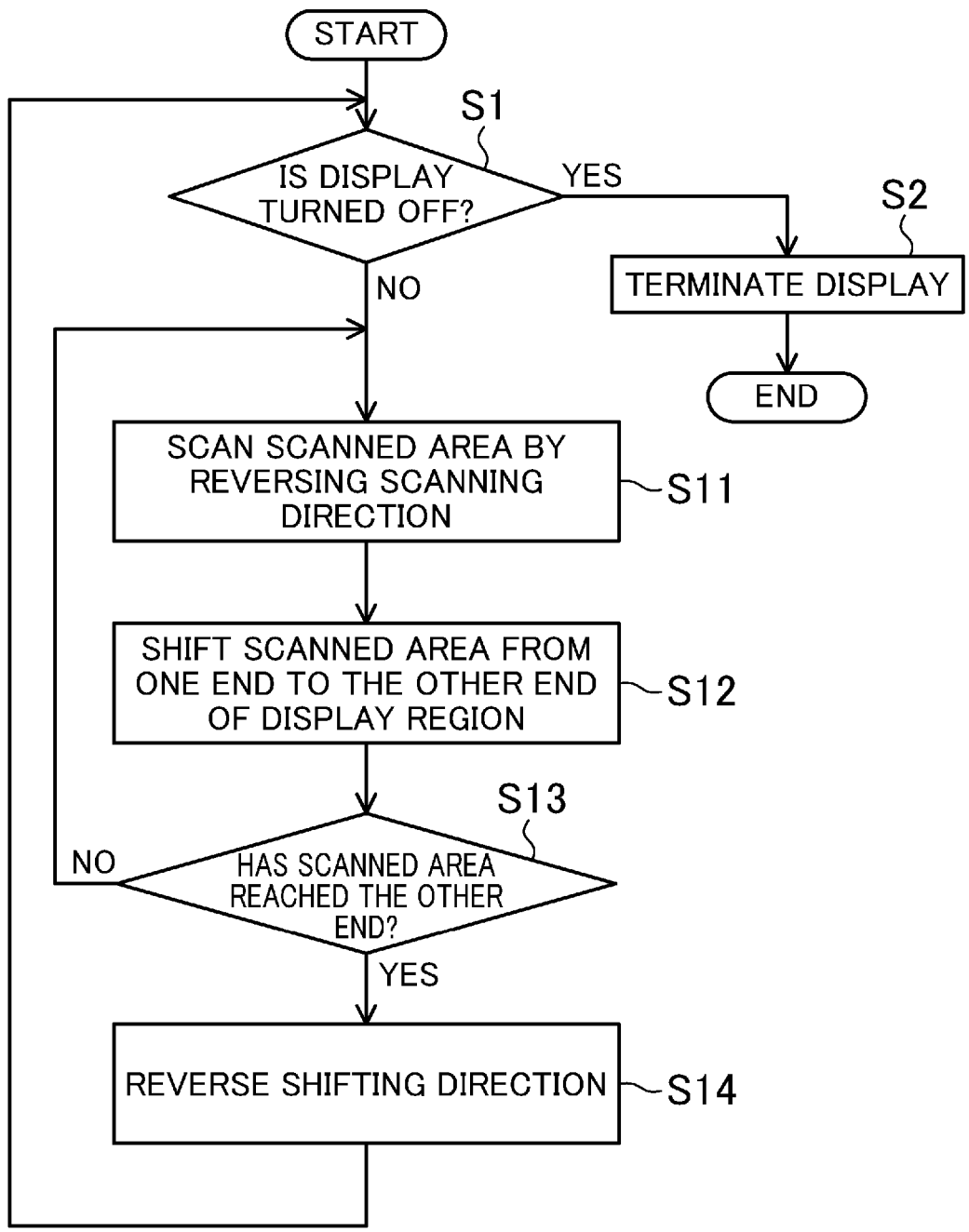
FIG. 13 is a flowchart associated with a display operation of the HMD of the variation.

In the HMD 1', this icon is displayed so as to move in the display region 5 along the X axis direction as shown in FIG. 11. This operation is described in detail below referring to the flowchart shown in FIG. 13.

Step S1 and Step S2 are the same as those of the HMD 1, and therefore the explanation thereof will be omitted.

Based on the temporarily stored image data, the controller 54 controls the first control unit 52a and the second control unit 52b. This causes the inclination angle of the reflective mirror 31 to be changed about the first axis A1 and about the second axis A2, thereby causing the laser beam to scan over the entire area of the scanned area 71 while moving continuously and bidirectionally (Step S11).

In more detail, when the laser beam is reflected to a center line Jn which halves, in the X axis direction, the scanned area 71 while the support plate 32 and the inner frame 33 are in a parallel state (a base state), the support plate 32 oscillates within predetermined angles about the first axis A1 and about the second axis A2.

For example, as shown in FIG. 12, if scanning is started from the pixel region Pu, then scanning is performed toward the pixel region Pd similarly to the case of the elemental regions 60 of the HMD 1.

When the pixel region Pd is reached, the scanning direction is reversed, and thus scanning is performed from the pixel region Pd to the pixel region Pu in the opposite direction. Such a scanning operation is repeated until a turn-off control is performed to stop displaying.

By changing the inclination angle of the reflective mirror unit 45 while providing the scanning control described above, shift control of the scanned area 71 in the display region 5 is provided (Step S12). The shifting speed of the scanned area 71 may be constant or changed with acceleration. In this embodiment, the scanned area 71 is shifted at a constant speed.

For example, assuming that the scanned area 71 is shifted from the left end to the right end of the display region 5 as shown in FIG. 11, a change in the inclination angle of the reflective mirror unit 45 causes the center line Jn of the scanned area 71 to continuously shift to the right, thereby causing the icon displayed in the scanned area 71 to move to the right accordingly.

When the scanned area 71 reaches an end of the display region 5 (YES at Step S13), the direction in which the scanned area 71 is shifted is reversed (Step S14). In the shown example, when the scanned area 71 reaches the right end of the display region 5, the shifting direction is reversed to the direction toward the left end of the display region 5. Until a turn-off control is performed, the control of shifting direction is provided, and thus the shifting direction is repeatedly reversed.

As a result, the icon moves in the display region 5, and the icon is displayed like a moving image. When the image data is changed while being displayed, the displayed content is changed accordingly. For example, if the image data of the icon is deleted while being displayed, the icon is no more displayed accordingly. Alternatively, if the image data of the icon is changed, the displayed icon is changed accordingly.

Figure 14:
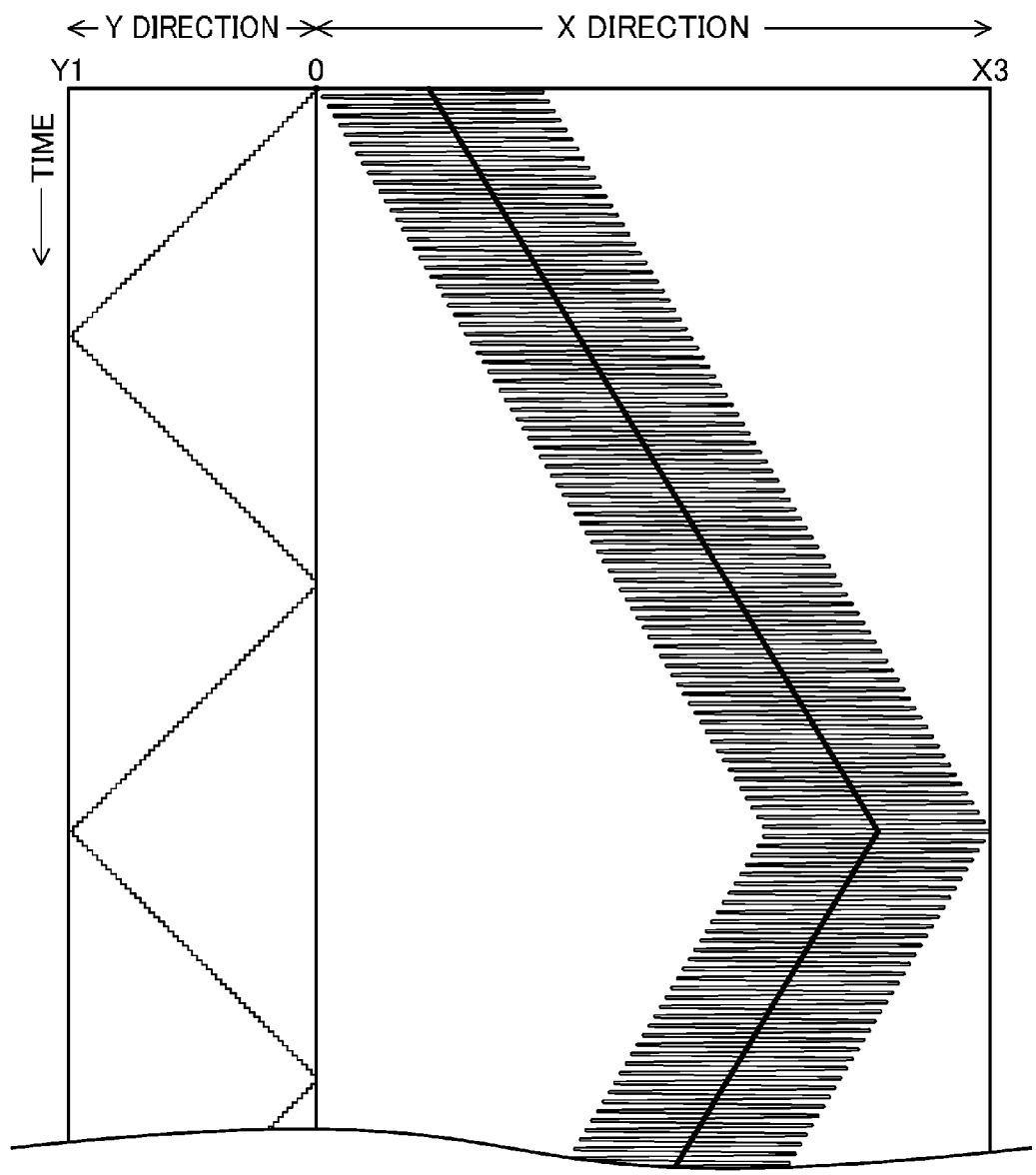
FIG. 14 is a timing chart of a scanning operation in the HMD of the variation.

FIG. 14 illustrates a timing chart of the scanning of this variation. As with FIG. 10, the right side of the timing chart shows the scan point along the X axis direction. The left side of the timing chart shows the scan point along the Y axis direction. The bold line in the X axis direction represents the location of the center line Jn.

If the image D, such as one shown in FIG. 11, is displayed only by means of the inclination angle of the reflective mirror 31, details of scan processing for displaying the image D need to be changed over time, and the pixel regions P for continuously displaying the image D need to be mapped again in accordance with movement of the image D. In contrast, in this HMD 1', details of scan processing for displaying the image D does not need to be changed, and a change in the inclination angle of the reflective mirror unit 45 is sufficient, thereby reducing the burden of mapping processing.

Note that, when the scanned area 71 is continuously shifted in such a manner, the image D is usually displayed with distortion. Accordingly, the HMD 1' includes a distortion correction mechanism in the controller 54 in order to display the image D without distortion. More specifically, the controller unit 24 incorporates a distortion correction program which calculates, in advance, a distortion factor dependent on the degree of distortion of the image D, based on the speed of tilting, the tilt angle, etc. of the reflective mirror unit 45.

The controller 54 corrects the image data before outputting the image data to the emission control unit 51 using the distortion factor obtained by the distortion correction mechanism. This operation allows the distortion of the image D to be corrected, and thus the image D without distortion to be displayed like a moving image. If the distortion of the image D can be neglected, and/or if the distortion of the image D is acceptable, the distortion correction mechanism does not need to be provided.

Figure 15:
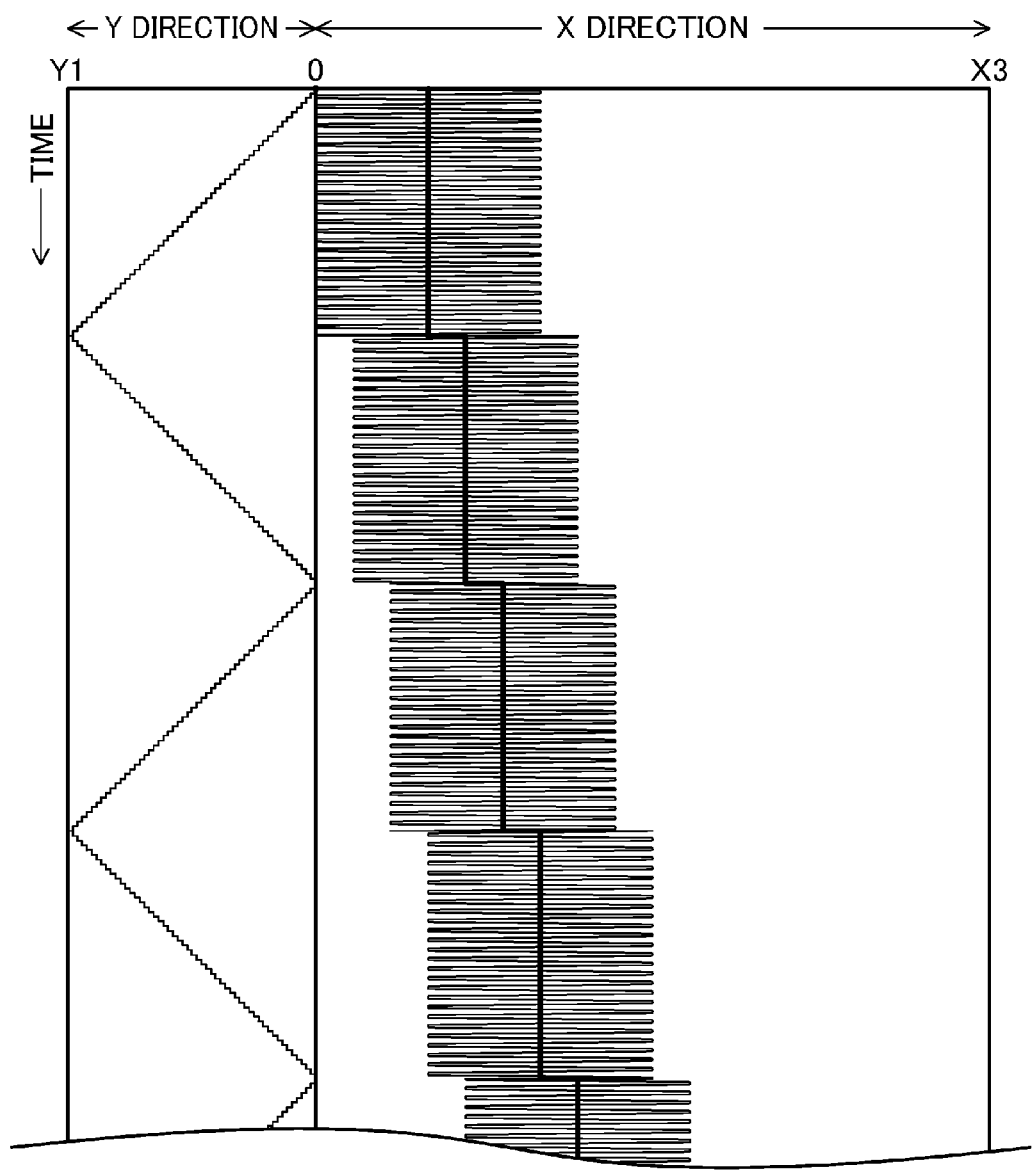
FIG. 15 is a timing chart of another example of a scanning operation in the HMD of the variation.

In addition, as shown in FIG. 15, the scanned area 71 may be periodically shifted by a certain amount when the scanning direction is reversed during scanning in the X axis direction. This operation allows the image D without distortion to be displayed while moving periodically, thereby allowing the image D to be displayed like a moving image without distortion.

(Advantages etc.)

The scanning device 23 according to the present disclosure causes a light ray to scan over the display region 5. The scanning device 23 includes the reflective mirror 31 which reflects the laser beam toward the display region 5, the main scanning unit 36 and 37 which changes the inclination angle of the reflective mirror 31, the reflective mirror unit 45 which includes the reflective mirror 31 and the main scanning unit 36 and 37, and the auxiliary scanning unit 38 which changes the inclination angle of the reflective mirror unit 45.

Since this scanning device 23 includes the auxiliary scanning unit 38 which changes the inclination angle of the reflective mirror unit 45, which includes the reflective mirror 31 and the main scanning unit 36 and 37, in addition to the main scanning unit 36 and 37 which changes the inclination angle of the reflective mirror 31, a change in the inclination angle of the reflective mirror unit 45 by the auxiliary scanning unit 38 allows the inclination angle of the reflective mirror 31 to be increased without changing the inclination angle of the reflective mirror 31. Thus, the scanned area can be broadened without increasing the mechanical load on the main scanning unit 36 and 37.

Specifically, the main scanning unit 36 and 37 has torsionally deformable support arms, and torsionally twisting the support arms causes the inclination angle of the reflective mirror to be changed.

In this case, if a large amount of inclination is required for the reflective mirror, then tilting the reflective mirror unit 45 can reduce the amount of twist of the support arms. Thus, the mechanical load on the support arms can be reduced.

More specifically, the reflective mirror unit 45 includes the first support member 33, disposed outside of, and spaced apart from, the reflective mirror 31, and the second support member 34, disposed outside of, and spaced apart from, the first support member 33. The support arms includes the first support arms 36, which couple together the reflective mirror 31 and the first support member 33; and the second support arms 37, which couple together the first support member 33 and the second support member 34. The first support arms 36 and the second support arms 37 extend at right angles to each other.

In this case, for example, a change in the inclination angle of the reflective mirror 31 due to the twists of the first support arms 36 allows the laser beam to scan in the X axis direction of the display region 5, and a change in the inclination angle of the reflective mirror 31 due to the twists of the second support arms 37 allows the laser beam to scan in the Y axis direction, perpendicular to the X axis direction, of the display region 5. Thus, the display region 5 can be scanned in a two-dimensional manner.

Still more specifically, the third support member 35, disposed outside of, and spaced apart from, the second support member 34 is also provided. The auxiliary scanning unit includes the torsionally deformable third support arms 38, which couple together the second support member 34 and the third support member 35. The third support arms 38 are arranged in alignment with either the first support arms 36 or the second support arms 37. Torsionally twisting the third support arms 38 causes the inclination angle of the reflective mirror unit 45 to be changed.

In this case, the third support arms 38, which changes the inclination angle of the reflective mirror unit 45, are arranged in alignment with either the first support arms 36 or the second support arms 37, and therefore torsionally twisting the third support arms 38 in the same direction as the support arms arranged in alignment therewith can broaden the range in which scanning can be performed using those support arms.

For example, a MEMS mirror 30 can be used in a main portion including the reflective mirror unit 45 and the auxiliary scanning unit 38.

Such a configuration improves durability of the MEMS mirror 30, thereby allowing a high quality HMD etc. to be provided.

In the display device of Patent Document 1 described above, a pair of pivot arms is disposed for each scanning direction. Therefore, a larger scanned area leads to a higher mechanical load on the pivot arms, thereby limiting the extent to which the scanned area can be broadened. Thus, a large display is difficult to achieve.

In contrast, the technology of this disclosure achieves a display device capable of providing a large display using the scanning device 23 described above.

For example, the display device 1 displays an image on the display region 5 by means of a laser beam which scans, and includes the scanning device 23 described above. The display device 1 includes the light source unit 22 which emits the laser beam toward the scanning device 23, the scanning control unit 52 which controls the scanning device 23, and the emission control unit 51 which controls the light source unit 22 so as to emit the laser beam in synchronism with displaying of the image. The display region 5 includes the plurality of elemental regions 60 coupled to one another. The scanning control unit 52 provides control so that the laser beam scans over one of the plurality of elemental regions 60 by changing the inclination angle of the reflective mirror 31 while maintaining the inclination angle of the reflective mirror unit 45, and also provides control so that the plurality of elemental regions 60 are changed over by changing the inclination angle of the reflective mirror unit 45.

In the case of this display device 1, the display region 5 includes the plurality of elemental regions 60 coupled to one another, and the scanning control unit 52 controls the main scanning unit 36 and 37, thereby performing scanning to display an image on each of the elemental regions 60, and the scanning control unit 52 controls the auxiliary scanning unit 38, thereby changing over the elemental regions 60 scanned. Thus, the range in which an image can be displayed can be broadened without increasing the mechanical load on the main scanning unit 36 and 37, and a large display can be achieved.

For example, the display device 1' displays an image on the display region 5 by means of a laser beam which scans, and includes the scanning device 23 described above. The display device 1' includes the light source unit 22 which emits the laser beam toward the scanning device 23, the scanning control unit 52 which controls the scanning device 23, and the emission control unit 51 which controls the light source unit 22 so as to emit the laser beam in synchronism with displaying of the image. The main scanning unit 36 and 37 operates so as to cause the laser beam to scan over the predetermined scanned area 71 having a smaller size than the display region 5. The scanning control unit 52 changes the inclination angle of the reflective mirror 31, thereby causing the laser beam to scan over the scanned area 71, and also changes the inclination angle of the reflective mirror unit 45, thereby shifting the scanned area 71 within the display region 5.

In the case of this display device 1', the scanning control unit 52 controls the main scanning unit 36 and 37, thereby performing scanning to display an image on the predetermined scanned area 71 having a smaller size than the display region 5, and the scanning control unit 52 also controls the auxiliary scanning unit 38, thereby causing the scanned area 71 to shift within the display region 5. Thus, the range in which an image can be displayed can be broadened without increasing the mechanical load on the main scanning unit 36 and 37, and furthermore, since the image displayed in the scanned area 71 moves in the display region 5 in association with the shift of the scanned area 71, the image can be displayed like a moving image.

Other Embodiments

As described above, the disclosed technology has been described using examples. However, the techniques according to the present disclosure are not limited to this embodiment and the variation thereof, but are also applicable to those where modifications, substitutions, additions, and omissions are made. In addition, elements described in the embodiment and in the variation may be combined to provide a different embodiment.

Figure 16:
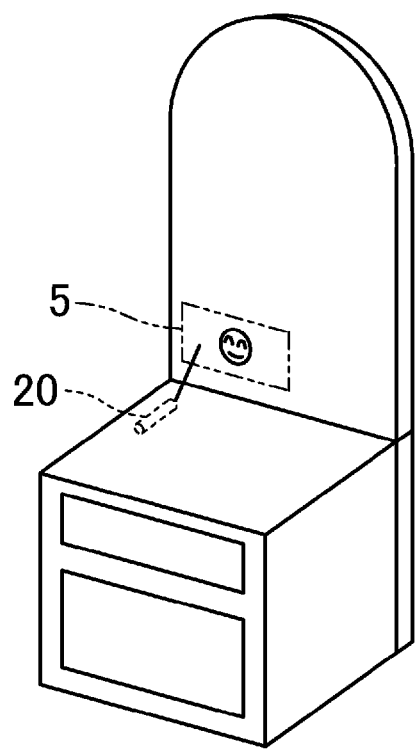
FIG. 16 is a schematic perspective view illustrating another example of application.

For example, the display device is not limited to an HMD. As shown in FIG. 16, the laser unit 20 etc. may be incorporated in a mirror table etc. to display the image D by reflecting the laser beam at the mirror.

Figure 17:
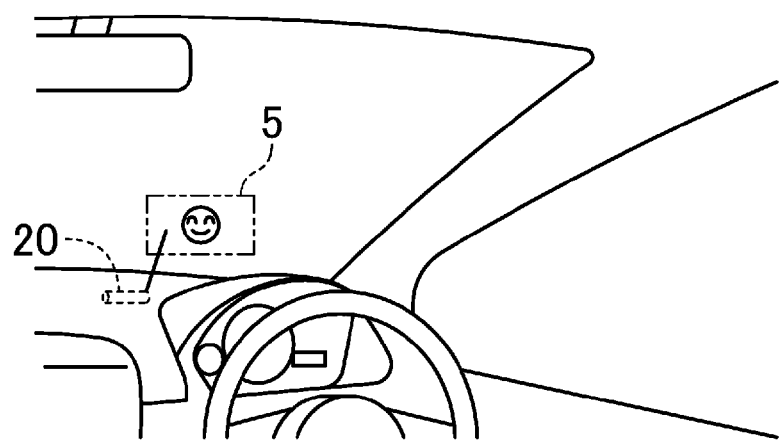
FIG. 17 is a schematic perspective view illustrating still another example of application.

In addition, as shown in FIG. 17, the laser unit 20 etc. may be incorporated in the front panel of a motor vehicle to display the image D by reflecting the laser beam at the front window. The image D may also be displayed on a window glass of a house, on a windshield of a helmet, etc.

The laser light source 22 is not limited to a semiconductor laser. For example, a light emitting diode (LED) light source may also be used. In this case, light emitted from the LED light source is condensed by an element such as a lens to generate a light ray like a laser beam. In fact, it suffices to emit light which is condensed to the extent that the image can be properly recognized.

The MEMS mirror 30 is not limited to an electromagnetically-driven type of device, but may also be an electrostatically-driven type of device. The scanning device 23 is not limited to being configured using the MEMS mirror 30, but may also be configured using, for example, a galvano-mirror.

What is claimed is:

1. A display device for displaying an image on a display region by a light ray which scans, the display device, comprising:
    a scanning device which causes the light ray to scan over the display region;
    a light source unit configured to emit the light ray toward the scanning device;
    a scanning control unit configured to control the scanning device; and
    an emission control unit configured to control the light source unit so as to emit the light ray in synchronism with displaying of the image, wherein:
    the scanning device is a MEMS mirror comprises:
        a reflective mirror unit including:
            a reflective mirror configured to reflect the light ray toward the display region; and
            a main scanning unit having a first support arm and a second support arm which are torsionally deformable, and which extend at right angles to each other, the main scanning unit configured to change an inclination angle of the reflective mirror by a torsional twist of the first support arm and the second support arm by a Lorentz force; and
        an auxiliary scanning unit having a third support arm which is torsionally deformable, and which is disposed in series with the first support arm or the second support arm, the auxiliary scanning unit configured to change an inclination angle of the reflective mirror unit by a torsional twist of the third support arm by a Lorentz force, and
    the scanning control unit provides:
        control so that the light ray scans over one of a plurality of elemental regions of the display region by changing the inclination angle of the reflective mirror while maintaining the inclination angle of the reflective mirror unit, and
        control so that the one of the plurality of elemental regions changed to another one of the plurality of elemental regions by changing the inclination angle of the reflective mirror unit.

2. A display device for displaying an image on a display region by means of a light ray which scans, the display device, comprising:
- a scanning device which causes the light ray to scan over the display region;
- a light source unit configured to emit the light ray toward the scanning device;
- a scanning control unit configured to control the scanning device; and
- an emission control unit configured to control the light source unit so as to emit the light ray in synchronism with displaying of the image, wherein:

the scanning device is a MEMS mirror comprising:
- a reflective mirror unit including:
  - a reflective mirror configured to reflect the light ray toward the display region; and
  - a main scanning unit having a first support arm and a second support arm which are torsionally deformable, and which extend at right angles to each other, the main scanning unit configured to change an inclination angle of the reflective mirror by a torsional twist of the first support arm and the second support arm by a Lorentz force; and
- an auxiliary scanning unit having a third support arm which is torsionally deformable, and which is disposed in series with the first support arm or the second support arm, the auxiliary scanning unit configured to change an inclination angle of the reflective mirror unit by a torsional twist of the third support arm by a Lorentz force, the main scanning unit operates so as to cause the light ray to scan over a scanned area having a smaller size than the display region, and the scanning control unit changes the inclination angle of the reflective mirror, thereby causing the light ray to scan over the scanned area, and also changes the inclination angle of the reflective mirror unit, thereby shifting from the scanned area to another scanned area within the display region.

* * * * *